US012645301B1

(12) United States Patent
Chin et al.

(10) Patent No.: US 12,645,301 B1
(45) Date of Patent: Jun. 2, 2026

(54) DISPLAY APPARATUS COMPRISING VIBRATION DEVICE

(71) Applicant: LG Display Co., Ltd., Seoul (KR)

(72) Inventors: MiHyung Chin, Gyeonggi-do (KR); Nam Ki, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/222,337

(22) Filed: May 29, 2025

(30) Foreign Application Priority Data

Dec. 27, 2024 (KR) ........................ 10-2024-0199156

(51) Int. Cl.
| | |
|---|---|
| *G06F 3/01* | (2006.01) |
| *G02F 1/1333* | (2006.01) |
| *G06F 3/041* | (2006.01) |
| *G06F 3/044* | (2006.01) |

(52) U.S. Cl.
CPC .......... *G06F 3/016* (2013.01); *G02F 1/13338* (2013.01); *G06F 3/0416* (2013.01); *G06F 3/044* (2013.01)

(58) Field of Classification Search
CPC ....................................................... G06F 3/016
See application file for complete search history.

(56) References Cited

U.S. PATENT DOCUMENTS

2020/0209973 A1* 7/2020 Kim ...................... B60K 35/10

FOREIGN PATENT DOCUMENTS

| KR | 20200124064 A | 11/2020 |
|---|---|---|
| KR | 20240104463 A | 7/2024 |

* cited by examiner

*Primary Examiner* — Gustavo Polo
(74) *Attorney, Agent, or Firm* — Fish & Richardson P.C.

(57) ABSTRACT

A display apparatus includes a display panel, a touch unit on the display panel, a cover substrate including a light transmitting area and a light shielding area and disposed on the touch unit, a light shielding layer on the light shielding area of the cover substrate, a vibrating element on the light shielding layer, and an adhesive layer between the light shielding layer and the vibrating element, wherein the display panel overlaps the light transmitting area of the cover substrate, wherein the light shielding layer includes a black matrix disposed between the cover substrate and the vibrating element.

13 Claims, 18 Drawing Sheets

DISPLAY APPARATUS COMPRISING VIBRATION DEVICE

CROSS-REFERENCE TO RELATED APPLICATION

Pursuant to 35 U.S.C. § 119(a), this application claims the benefit of an earlier filing date and right of priority to Korean Patent Application No. 10-2024-0199156 filed on Dec. 27, 2024, the contents of which are hereby incorporated by reference in their entirety.

TECHNICAL FIELD

The present disclosure relates to a display apparatus including a vibrating element.

BACKGROUND

Recently, haptic technology has been developed to provide haptic feedback or tactile feedback corresponding to touch input when a user touches a screen of a display apparatus. The display apparatus to which haptic technology is applied stimulates the user's sense of touch by stimulating the human body's tactile receptors known as tangoreceptors, thereby allowing the user to recognize touch and the texture of the touch.

Tactile feedback is also called haptic feedback. When haptic feedback is applied, more vivid feedback may be provided to a user using touch interface.

Haptic feedback is a technology that allows a user to feel touch, force, and movement through input devices such as keyboards, mouse, joysticks, and touch screen panels. In particular, technology related to tactile feedback using sensations perceived by the skin are relatively easy to implement, and thus are applied to portable electronic devices such as smart phones, electronic notebooks, electronic books, PMPs portable multimedia players, navigation devices, mobile phones, tablet PCs personal computers, smart watches, watch phones, wearable devices, and game consoles.

SUMMARY

According to an aspect of the present disclosure, a display apparatus includes a display panel, a touch unit on the display panel, a cover substrate including a light transmitting area and a light shielding area on the touch unit, a light shielding layer on the light shielding area of the cover substrate, a vibrating element on the light shielding layer, an adhesive layer between the light shielding layer and the vibrating element, wherein the display panel overlaps the light transmitting area of the cover substrate, wherein the light shielding layer comprising a black matrix disposed between the cover substrate and the vibrating element.

The light shielding layer comprises an opening, in which the black matrix is not disposed, and at least a portion of the vibrating element is disposed on the opening.

The opening may be formed by removal of the black matrix.

The adhesive layer may contact with the cover substrate and the vibrating element on the opening.

The above adhesive layer may have light blocking property.

The above adhesive layer may least partially overlap the black matrix.

The black matrix may include a first black matrix line and a second black matrix line spaced apart from each other, and the opening may be disposed between the first black matrix line and the second black matrix line.

The display apparatus may further comprise a light shielding pattern disposed in the opening.

The vibrating element may include a first electrode, a piezoelectric layer on the first electrode, and a second electrode on the piezoelectric layer.

The display apparatus further includes a touch sensing unit that sensing a touch and a vibration driver that provides a vibration driving signal to the vibrating element, and the vibration driver may generate the vibration driving signal based on the touch sensing signal of the touch sensing unit.

The display apparatus further includes a first connection wire connected to the first electrode of the vibrating element, and a second connection wire connected to the second electrode of the vibrating element, and wherein the vibration driving signal may be input to the first electrode of the vibrating element through the first connection wire.

The display apparatus may further include a fixing member to fix the vibrating element.

One end of the above fixed member may be fixed to the display panel.

The above display apparatus further includes a backlight unit overlapping the display panel, and one end of the fixing member may be fixed to the backlight unit.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
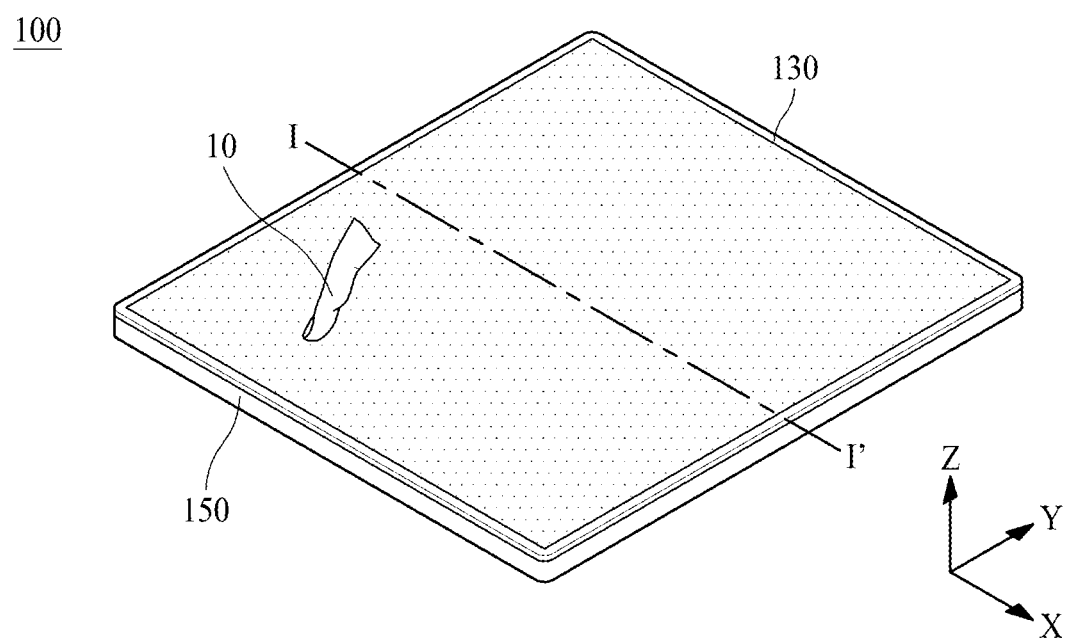
FIG. 1 is a schematic perspective view of the display apparatus according to one implementation of the present disclosure.

The vibrating element or actuator is used for haptic feedback. Even when such a vibrating element or actuator is used, it is necessary to ensure that the display area of the display apparatus is not reduced. In addition, it is necessary to ensure that the vibrating element or actuator is stably attached to the display apparatus.

One implementation of the present disclosure provides a display apparatus in which the display area is not reduced even when the display apparatus is equipped with a vibrating element or actuator for haptic feedback.

One implementation of the present disclosure provides a technology that enables a vibrating element or actuator to be stably placed and attached to a display apparatus for haptic feedback.

One implementation of the present disclosure provides a technology that enables stable attachment to be maintained even when a vibrating element or actuator is placed on a black matrix layer of a display apparatus.

The subjects to be solved according to one implementation of the present disclosure are not limited to the subjects mentioned above, and other subjects not mentioned will be clearly understood by those skilled in the art from the description below.

The advantages and features of the present disclosure, and the method for achieving them, will become clear with reference to the implementations described in detail below together with the accompanying drawings. However, the present disclosure is not limited to the implementations disclosed below, but may be implemented in various different forms.

The shapes, sizes, ratios, angles, numbers, etc. disclosed in the drawings for explaining implementations of the present disclosure are examples, and the present disclosure is not limited to the matters illustrated in the drawings. The same components may be referred to by the same reference numerals throughout the specification. In addition, in explaining the present disclosure, if it is determined that a detailed description of a related known technology may unnecessarily obscure the gist of the present disclosure, the detailed description is omitted.

In the case where the terms 'includes', 'has', 'consists of', etc. are used in one implementation of the present disclosure, other parts may be added unless the expression 'only' is used. When a component is expressed in the singular, it includes the plural unless there is a specifically stated description.

When interpreting a component, it is interpreted as including the error range even if there is no separate explicit description.

When describing a positional relationship, for example, when the positional relationship between two parts is described as 'on', 'above', 'below', 'next to', etc., one or more other parts may be located between the two parts, unless the expression 'right' or 'directly' is used.

The spatially relative terms "below," "beneath," "lower," "above," "upper," and the like may be used to easily describe the relationship of one element or component to another element or component, as illustrated in the drawings. It should be understood that the spatially relative terms include different orientations of the elements during use or operation in addition to the orientations depicted in the drawings. For example, if an element illustrated in the drawings is flipped over, an element described as "below" or "beneath" another element may end up being placed "above" the other element. Thus, the term "below" may include both the above and below directions. Likewise, the term "above" or "above" may include both the above and below directions.

When describing a temporal relationship, for example, when describing a temporal relationship such as 'after', 'following', 'next to', 'before', etc., it may also include cases where it is not continuous, as long as the expression 'right away' or 'directly' is not used.

Although the terms first, second, etc. are used to describe various components, these components are not limited by these terms. These terms are only used to distinguish one component from another. Accordingly, a first component referred to below may also be a second component within the technical concept of the present disclosure.

At least one term should be understood to include all combinations that may be presented from one or more of the associated items. For example, the meaning of "at least one of the first, second and third items" may mean not only each of the first, second or third items, but also all combinations of items that may be presented from two or more of the first, second and third items.

The features of each of the various implementations of the present disclosure may be partially or wholly combined or combined with one another, and may be technically linked and driven in various ways, and each implementation may be implemented independently of one another or may be implemented together in a related relationship.

The display apparatus according to one implementation of the present disclosure may refer to a display module including a display panel and a driving unit for driving the display panel. The display module may include a liquid crystal display module and a light-emitting display module such as an organic light-emitting display module. In addition, the display apparatus may also refer to a complete product or a final product including a display module such as a notebook computer, a television, a computer monitor, equipment apparatus for an automotive apparatus or another form of a vehicle, or a set electronic apparatus such as a mobile electronic apparatus including a smart phone or an electronic pad.

Hereinafter, implementations of the present disclosure will be described in detail with reference to the attached drawings. The scale of components illustrated in the drawings may have a different scale from the actual scale for convenience of explanation. Therefore, the actual components are not limited to the scale illustrated in the drawings.

Figure 2:
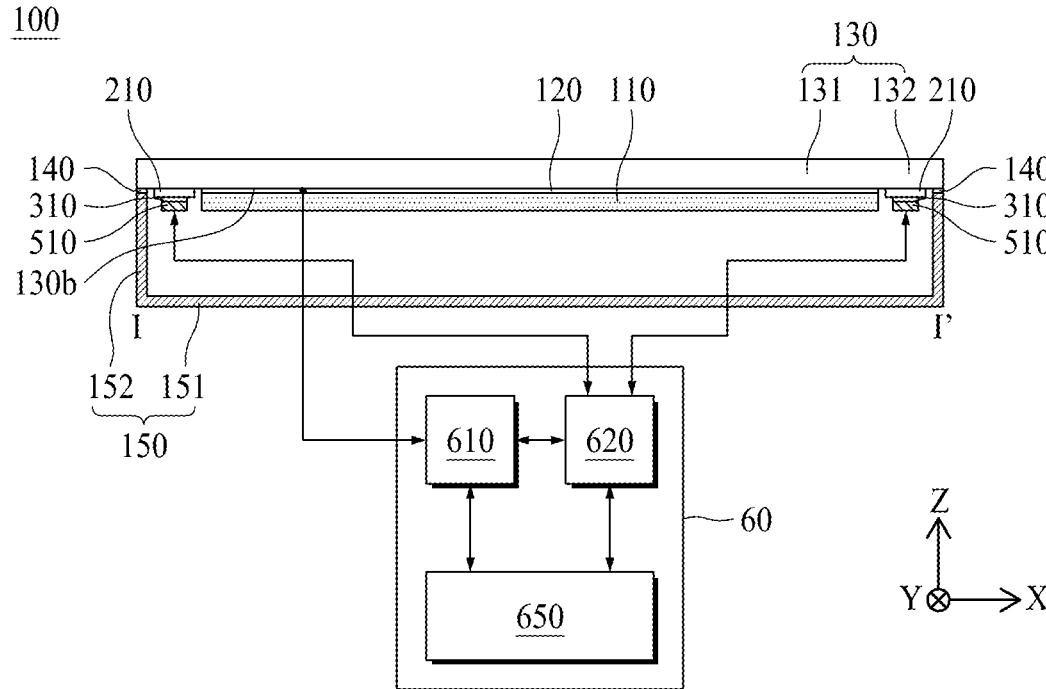
FIG. 2 is a cross-sectional view taken along line I-I' of FIG. 1 and a drawing of a touch driving circuit.

FIG. 1 is a schematic perspective view of a display apparatus 100 according to one implementation of the present disclosure, and FIG. 2 is a cross-section taken along line I-I' of FIG. 1 and a drawing of a touch driving circuit.

The display apparatus 100 according to one implementation of the present disclosure includes a display panel 110, a touch unit 120, a cover substrate 130, a joining member 140, a support member 150, a light shielding layer 210, a vibrating element 510, and an adhesive layer 310.

Referring to FIGS. 1 and 2, the display apparatus 100 may sense at least one of a finger touch via a finger 10 and a touch via a touch pen or stylus pen.

The display panel 110 may display an image. The display panel 110 may include a plurality of pixels configured to display an image. For example, the display panel 110 may include an organic light-emitting display panel having a plurality of pixels that constitute a black and white or color image. In addition, the display panel 110 may include a display panel such as a liquid crystal display panel, an electrophoretic display panel, a mini light-emitting diode display panel, a micro light-emitting diode display panel, an electro-wetting display panel, or a quantum dot light-emitting display panel.

However, the display panel 110 is not limited thereto, and any panel capable of displaying an image may be the display panel 110 according to one implementation of the present disclosure. The display panel 110 is not limited in its shape or size.

The touch unit 120 may be disposed on the display panel 110. The touch unit 120 includes a touch electrode. The touch unit 120 may also be referred to as a touch screen.

The touch unit 120 may sense a user touch on the display apparatus 100. For example, the touch unit 120 may sense a user touch via a touch pen or a finger 10. The touch unit 120 may connect to the display panel 110. For example, the display panel 110 and the touch unit 120 may be formed integrally.

The touch unit 120 may be disposed to cover the front surface of the display panel 110. At this time, the touch unit 120 may be disposed between the display unit of the display panel 110 and the cover substrate 130, but implementations of the present disclosure are not limited thereto. For example, the touch unit 120 may be disposed in the pixel array unit of the display panel 110. In this case, the touch unit 120 may be configured as an in-cell touch panel. However, implementations of the present disclosure are not limited thereto, and the touch electrode layer may be the touch unit 120, and the touch sensor layer may be the touch unit 120.

For example, the touch unit 120 may include an electrode structure corresponding to a self-capacitance type composed only of a plurality of touch sensing electrodes or a mutual-capacitance type composed of a plurality of touch driving electrodes and a plurality of touch sensing electrodes intersecting each other.

The cover substrate 130 may be disposed on the touch unit 120. The cover substrate 130 is the frontmost structure of the display apparatus 100 and may be disposed on the front of the display panel 110. At this time, the cover substrate 130 may protect the display panel 110 and the touch unit 120 from external impact by covering the front or screen of the display panel 110. At this time, the touch unit 120 may be disposed between the cover substrate 130 and the display panel 110, and may be connected or attached to the rear surface 130b of the cover substrate 130.

According to one implementation of the present disclosure, the cover substrate 130 may be made of, but is not limited to, transparent plastic, glass, or tempered glass. The cover substrate 130 may be referred to as, for example, a front structure, a front window, a cover window, a glass window, a cover screen, a screen cover, or window glass.

The support member 150 may cover or surround the rear surface of the display panel 110. The support member 150 may be combined with the cover substrate 130 to form a space that accommodates the display panel 110 and the touch unit 120. The side of the display panel 110 where the cover substrate 130 is disposed is referred to as the front surface, and the side of the display panel 110 opposite to the cover substrate 130 is referred to as the rear surface of the display panel 110. In one implementation of the present disclosure, the X-axis direction may be referred to as a horizontal direction, the Y-axis direction may be referred to as a vertical direction, and the Z-axis direction may be referred to as a thickness direction. The screen of the display apparatus 100 may be displayed in the Z-axis direction, and the Z-axis direction may be referred to as the front surface.

The support member 150 may include a first support member 151 and a second support member 152. The first support member 151 may cover the rear surface of the display panel 110. The first support member 151 may be spaced apart from the rear surface of the display panel 110. For example, the first support member 151 may be referred to as a bottom portion, a bottom plate, a support plate, a housing plate, or a housing bottom portion, but is not limited thereto.

The second support member 152 may be connected to an edge portion of the first support member 151. For example, the second support member 152 may be bent from an edge portion of the first support member 151. The second support member 152 may be referred to as a side, a side wall, a support side wall, a housing side, or a housing side wall, but is not limited thereto.

The second support member 152 may be formed integrally with the first support member 151. As a result, an internal space surrounded by the second support member 152 may be provided above the first support member 151.

The joining member 140 may be positioned between the cover substrate 130 and the supporting member 150. At this time, the supporting member 150 may be joined or connected to the cover substrate 130 by the joining member 140. The supporting member 150 may be joined or connected to an edge portion of the rear surface of the cover substrate 130 via the joining member 140. Accordingly, the supporting member 150 may surround each side of the touch unit 120 and the display panel 110.

The display apparatus 100 according to one implementation of the present disclosure may include a light shielding layer 210 on a cover substrate 130, a vibrating element 510 on the light shielding layer 210, and an adhesive layer 310 between the light shielding layer 210 and the vibrating element 510. The light shielding layer 210 is disposed on a light shielding area 132 of the cover substrate 130, and the vibrating element 510 is disposed on the light shielding layer 210. The vibrating element 510 may be fixed and attached to the light shielding layer 210 by the adhesive layer 310 disposed between the light shielding layer 210 and the vibrating element 510. The light shielding layer 210, the vibrating element 510, and the adhesive layer 310 may be disposed on the rear surface 130b of the cover substrate 130. Here, the rear surface 130b of the cover substrate 130 refers to the surface of the cover substrate 130 that faces the display panel 110. In addition, among the surface of the cover substrate 130, the surface that faces the user is referred to as the front surface of the cover substrate 130. In the following implementations, the definitions of the rear surface 130b and the front surface of the cover substrate 130 are the same.

The display apparatus 100 according to one implementation of the present disclosure may include a touch driving circuit 60. The touch driving circuit 60 may include a touch sensing unit 610, a vibration driver 620, and a control unit 650.

The touch sensing unit 610 may electrically connect to a plurality of touch units 120. In this case, when the touch electrode arranged in the touch unit 120 is touched, the touch sensing unit 610 may sense the corresponding input value. That is, the touch sensing unit 610 may drive and sense all or part of the plurality of touch electrodes to receive a touch sensing signal, sample the received touch sensing signal to generate touch sensing data, and output the touch sensing signal or the touch sensing data. At this time, the touch sensing signal may be analog information such as a voltage signal, and the touch sensing data may be digital information converted into a digital form, but is not limited thereto.

The control unit 650 may control the touch sensing unit 610 and the vibration driver 620. The control unit 650 may generate a control signal for controlling the operation of the touch sensing unit 610 and the vibration driver 620, and transmit the generated control signal to each of the touch sensing unit 610 and the vibration driver 620. In addition, the control unit 650 may perform a touch algorithm using a touch sensing signal or touch sensing data received from the touch sensing unit 610, and determine the presence or absence of a touch input and the touch position. The control unit 650 may electrically connect the vibrating element 510 and the vibration driver 620.

The vibration driver 620 is electrically connected to the vibrating element 510 and may apply a vibration driving signal to the vibrating element 510 to vibrate the vibrating element 510. The vibration driver 620 may generate a vibration driving signal based on a touch sensing signal and provide the vibration driving signal to the vibrating element 510. The vibration driver 620 may generate a vibration driving signal according to the control of the control unit 650 and provide the vibration driving signal to the vibrating element 510. In addition to a touch operation, the vibration driver 620 may generate a vibration driving signal for system notifications, such as low battery, low memory, security notification, as well as for incoming messages or phone calls, program notifications, and the like, but is not limited thereto.

Figure 3:
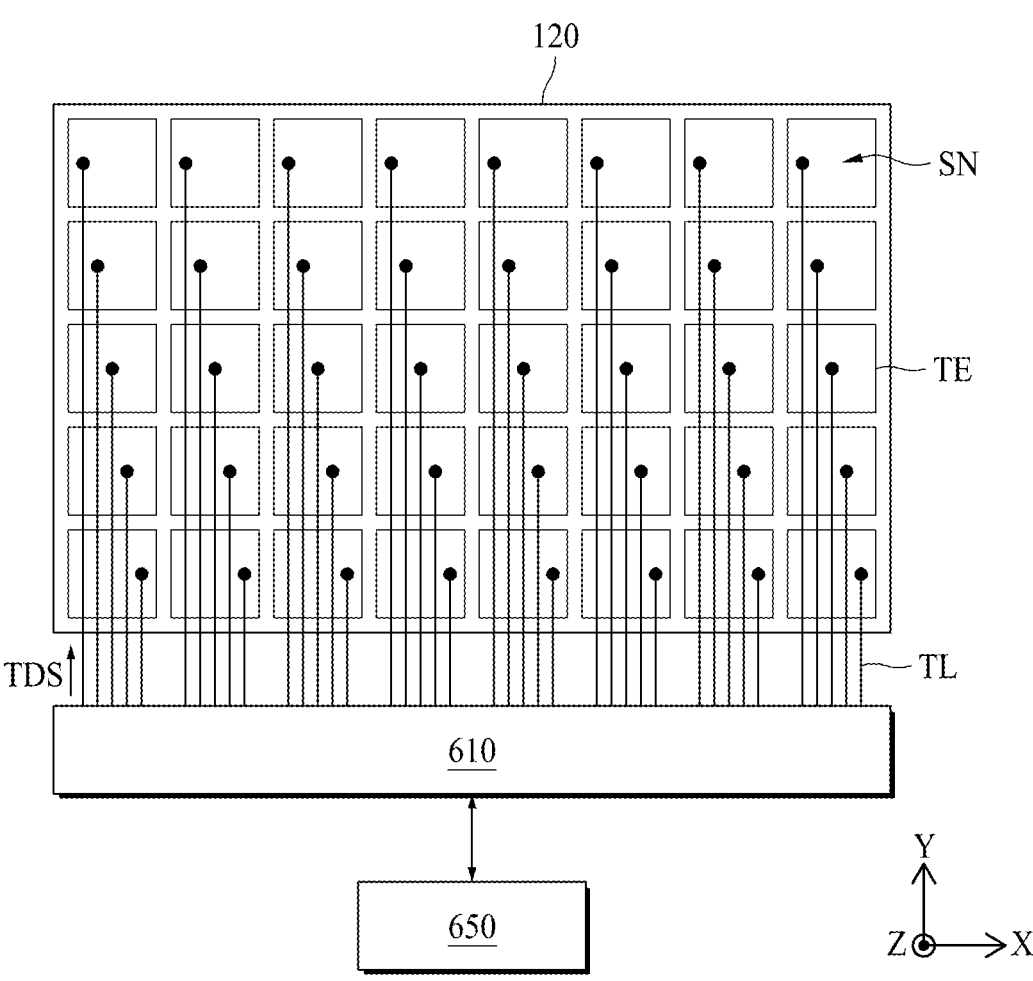
FIG. 3 is a schematic diagram of the touch unit, touch sensing unit, and control unit of FIG. 2.

FIG. 3 is a schematic diagram of the touch unit 120, touch sensing unit 610, and control unit 650 shown in FIG. 2. FIG. 3 illustrates a touch panel as the touch unit 120.

Referring to FIG. 3, the touch unit 120 may include a touch sensor SN comprising a plurality of touch electrodes TE. In addition, the touch unit 120 may include a plurality of touch lines TL for electrically connecting the plurality of touch electrodes TE to the touch sensing unit 610.

The touch sensing unit 610 may supply a touch driving signal TDS to all or part of a plurality of touch electrodes TE, sense all or part of the plurality of touch electrodes TE, generate a touch sensing signal or touch sensing data, and provide the result to the control unit 650.

Figure 4:
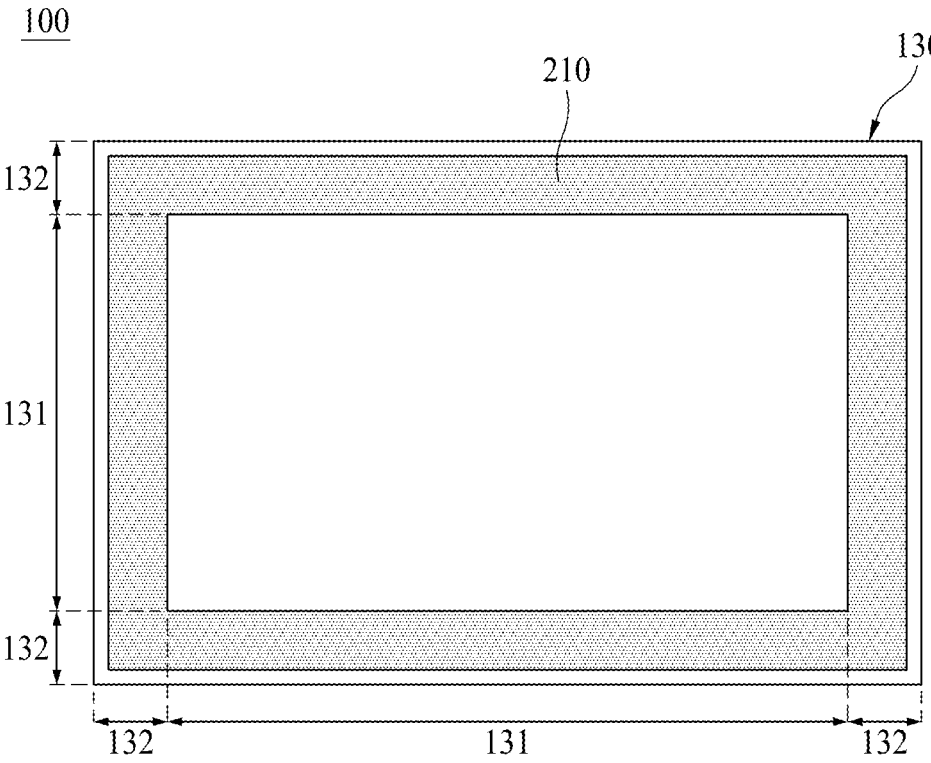
FIG. 4 is a plan view of a light shielding layer disposed on the cover substrate of FIG. 2.

FIG. 4 is a plan view of a light shielding layer 210 disposed on the cover substrate 130 of FIG. 2. The light shielding layer 210 is disposed on the rear surface 130*b* of the cover substrate 130. In other implementations below, the light shielding layer 210 is also disposed on the rear surface 130*b* of the cover substrate 130.

Referring to FIG. 4, the cover substrate 130 may include a light transmitting area 131 and a light shielding area 132. The light transmitting area 131 is a region that transmits light. The light shielding area 132 is a region that blocks light. By placing a light shielding member such as a black matrix 211 in the light shielding area 132, light may be blocked at the light shielding area 132. The light transmitting area 131 may be defined as a region surrounded by the light shielding area 132.

The display panel 110 may be disposed to overlap with the light transmitting area 131. Accordingly, the image displayed on the display panel 110 may be recognized from the outside through the light transmitting area 131. The viewer may visually recognize the image displayed on the display panel 110 through the light transmitting area 131 of the cover substrate 130.

The light shielding layer 210 is disposed on the light shielding area 132 on the rear surface 130*b* of the cover substrate 130. The light shielding area 132 may block light by the light shielding layer 210. The light shielding layer 210 prevents light incident on the cover substrate 130 from passing through the light shielding area 132.

The light shielding layer 210 includes a black matrix 211 disposed on the light shielding area 132. The black matrix 211 may be disposed between the cover substrate 130 and the vibrating element 510. The black matrix 211 serves as a light shielding member that blocks light.

An area defined by the border of the black matrix 211 may be a light shielding area 132 of the cover substrate 130. The black matrix 211 is disposed on the light shielding area 132, and the light shielding area 132 may be defined by the black matrix 211.

Figure 5:
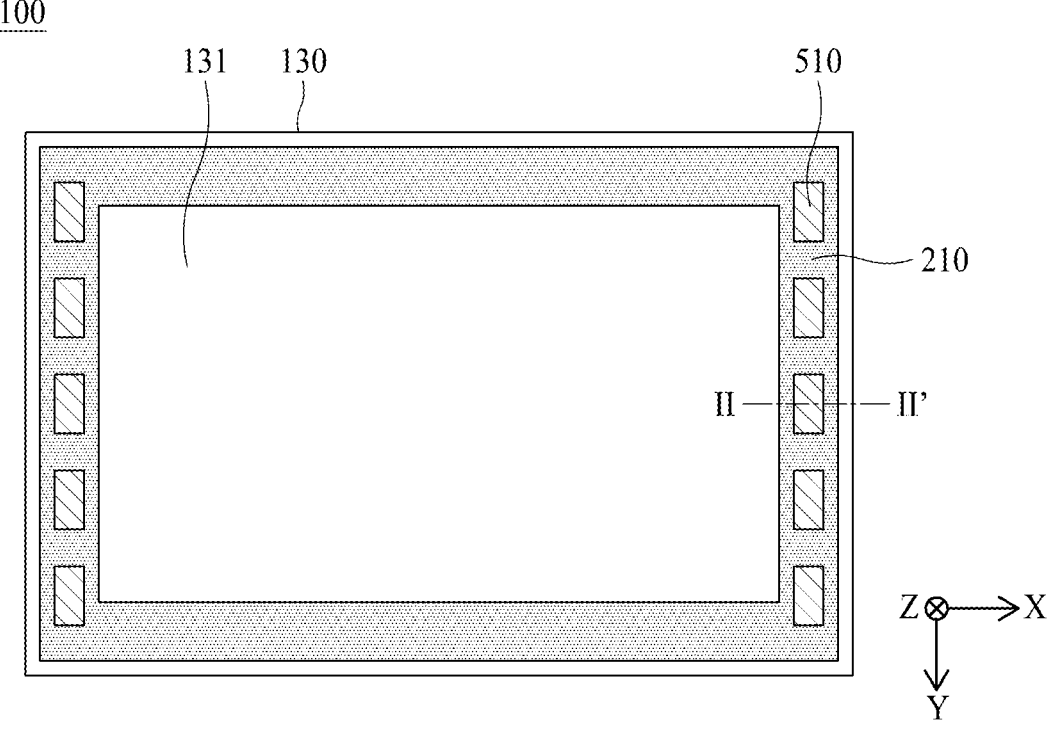
FIG. 5 is a plan view, in which vibrating elements are arranged on the light shielding layer of FIG. 4.
Figure 6:
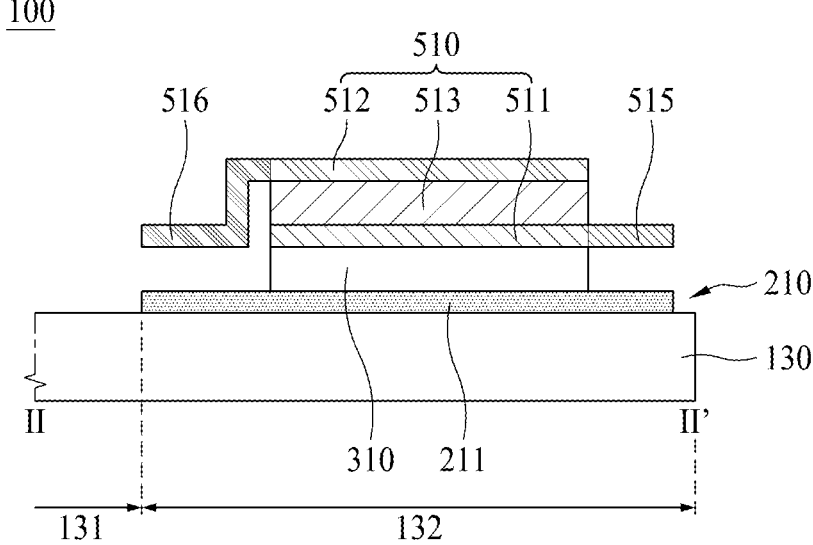
FIG. 6 is a cross-sectional view taken along line II-II' of FIG. 5.

FIG. 5 is a plan view of a vibrating element 510 disposed on a light shielding layer 210 of FIG. 4, and FIG. 6 is a cross-sectional view taken along line II-II' of FIG. 5.

FIG. 5 may be a plan view of a state in which a light shielding layer 210 and a vibrating element 510 are disposed on the rear surface 130*b* of a cover substrate 130. Referring to FIG. 5 and FIG. 6, the vibrating element 510 is disposed on the light shielding layer 210. An adhesive layer 310 may be disposed between the light shielding layer 210 and the vibrating element 510. The adhesive layer 310 fixes the vibrating element 510 on the cover substrate 130. The vibrating element 510 may be attached to a black matrix 211 on the cover substrate 130 by the adhesive layer 310. The vibrating element 510 may be an actuator, but is not limited thereto.

The vibrating element 510 includes a first electrode 511, a piezoelectric layer 513 on the first electrode 511, and a second electrode 512 on the piezoelectric layer 513.

The first electrode 511 and the second electrode 512 are spaced apart from each other with the piezoelectric layer 513 interposed therebetween, and at least a portion of the first electrode 511 and the second electrode 512 may be formed of a metal material having low resistance and excellent heat dissipation properties. Alternatively, the first electrode 511 and the second electrode 512 may include a transparent conductive oxide or a conductive polymer.

The first electrode 511 and the second electrode 512 may each include at least one of a metal including silver Ag, magnesium Mg, aluminum Al, copper Cu, platinum Pt, palladium Pd, gold Au, nickel Ni, neodymium Nd, iridium Ir, and chromium Cr, a transparent conductive oxide including ITO (InSnO), IZO (InZnO), IZTO (InZnSnO), ZnO, and $In_2O_3$, and a conductive polymer including polyaniline, polypyrrole, and polythiopene.

The piezoelectric layer 513 includes a piezoelectric material. The piezoelectric material may generate vibrations by an electric field. When pressure or a torsion phenomenon is applied to the crystal structure of the piezoelectric material by an external force, a potential difference may be generated in the piezoelectric material due to dielectric polarization according to a change in the relative positions of positive (+) ions and negative (−) ions. Conversely, when an electric field is applied to the piezoelectric material, the piezoelectric material may generate vibrations.

Referring to FIG. 6, the vibrating element 510 may be connected to a first connecting line 515 and a second connecting line 516. The first connecting line 515 is connected to the first electrode 511 and may extend to a portion other than a portion where the piezoelectric layer 513 is disposed. The second connecting line 516 is connected to the second electrode 512 and may extend to a portion other than a portion where the piezoelectric layer 513 is disposed. The first connecting line 515 and the second connecting line 516 may be connected to an external terminal, an external pad, or a driving circuit, respectively.

The first connecting line 515 may be formed integrally with the first electrode 511, and the second connecting line 516 may be formed integrally with the second electrode 512. Although not shown in the drawing, the first connecting line and the second connecting line may be formed separately from the first electrode and the second electrode, respectively. In addition, the first electrode and the second electrode may be stacked in multiple layers, and a plurality of piezoelectric layers may be disposed between the first electrode and the second electrode.

The black matrix 211 may contact with the cover substrate 130. The black matrix 211 is disposed on the light shielding area 132 of the cover substrate 130. The black matrix 211 may be formed on the light shielding area 132 by coating, but is not limited thereto. The black matrix may be formed on the light shielding area 132 by deposition, or a black matrix in the form of a film may be attached to the light shielding area 132.

Figure 7:
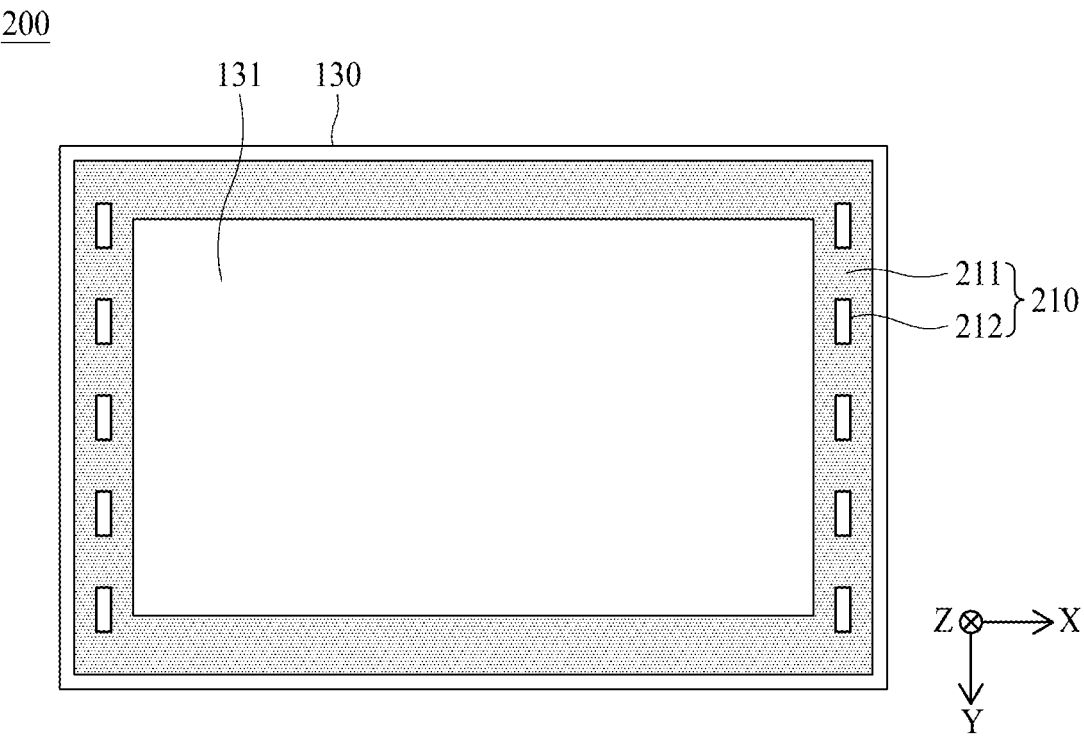
FIG. 7 is a plan view of a light shielding layer disposed on a cover substrate of a display apparatus according to another implementation of the present disclosure.

FIG. 7 is a plan view of a light shielding layer 210 disposed on a cover substrate 130 of a display apparatus 200 according to another implementation of the present disclosure. FIG. 7 illustrates a light shielding layer 210 disposed on the rear surface 130b of the cover substrate 130. The light shielding layer 210 illustrated in FIG. 7 is different from the light shielding layer 210 illustrated in FIGS. 4 and 5 in that it includes an opening 212. Hereinafter, descriptions of components already described will be omitted to avoid duplication.

The light shielding layer 210 illustrated in FIG. 7 may include an opening 212 in which a black matrix 211 is not disposed, compared to the light shielding layer illustrated in FIGS. 4 and 5. The light shielding layer 210 may include a black matrix region in which a black matrix 211 is disposed and an opening 212 in which black matrix 211 is not disposed.

The opening 212 may be defined by a black matrix 211. The opening 212 is an area in the light shielding layer 210 where the black matrix 211 is not disposed, and may be an area surrounded by the black matrix 211.

An opening 212 may be formed by the removal of a portion of the black matrix 211 disposed in the light blocking layer 210. In detail, a portion of the black matrix 211 disposed on the light shielding layer 210 may be removed to form an opening 212. Although the opening 212 is illustrated as having a rectangular shape in FIG. 7, the shape of the opening 212 is not limited thereto. The opening 212 may have various other planar shapes other than a rectangular shape.

Figure 8A:
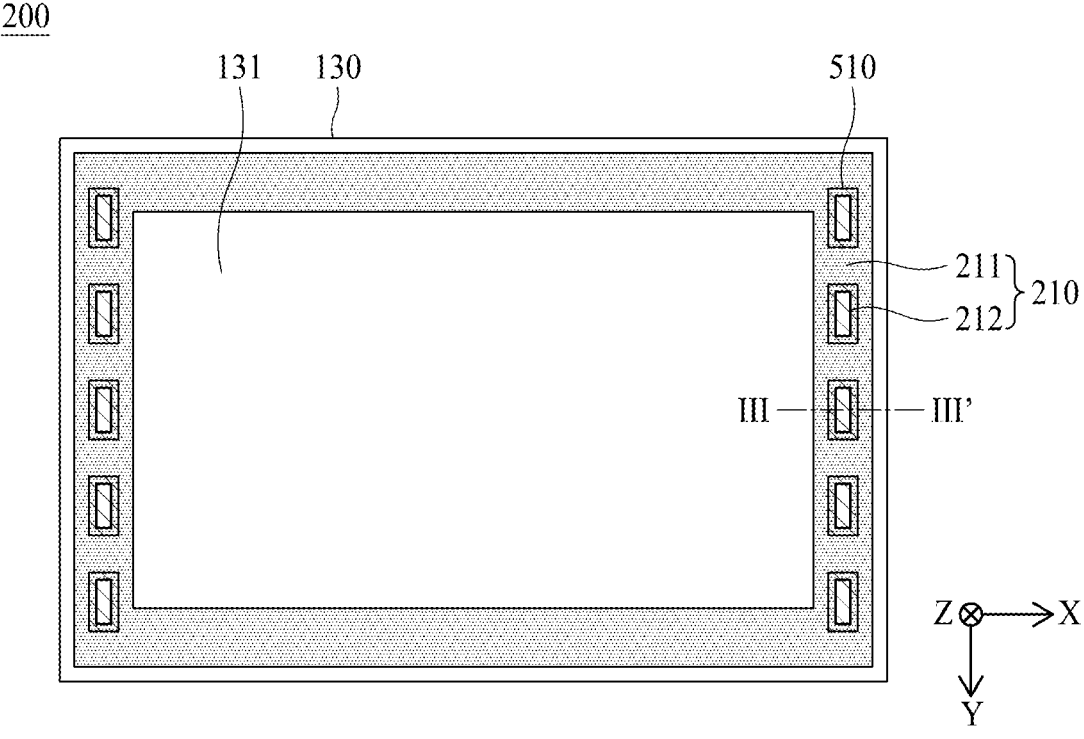
FIG. 8A is a plan view, in which vibrating elements are arranged on the light shielding layer of FIG. 7.
Figure 8B:
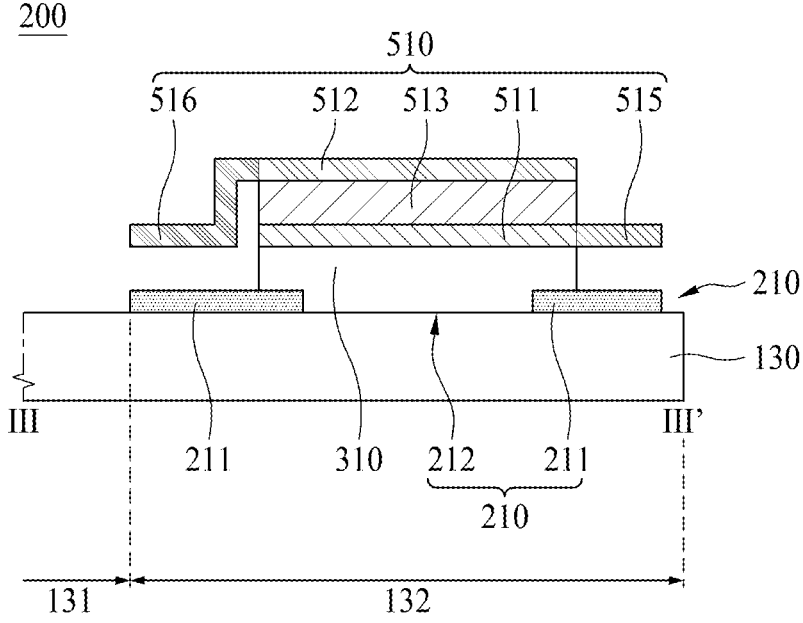
FIG. 8B is a cross-sectional view taken along line III-III' of FIG. 8A.

FIG. 8A is a plan view of a vibrating element 510 disposed on a light shielding layer 210 of FIG. 7, and FIG. 8B is a cross-sectional view taken along line III-III' of FIG. 8A.

At least a portion of the vibrating element 510 may be disposed on the opening 212 of the light shielding layer 210. Additionally, the adhesive layer 310 may be contact the vibrating element 510 and the cover substrate 130 on the opening 212.

Referring to FIGS. 8A and 8B, since the adhesive layer 310 contact with the vibrating element 510 and simultaneously with the cover substrate 130, the vibrating element 510 may be attached to the cover substrate 130 via the adhesive layer 310.

When the adhesive layer 310 is in direct contact with the cover substrate 130, stronger adhesion and bonding may be achieved compared to when the adhesive layer 310 is in contact with the black matrix 211. As a result, the vibrating element 510 may be strongly attached to the cover substrate 130.

In addition, when the adhesive layer 310 is in direct contact with the cover substrate 130, peeling or separation of the black matrix 211 from the cover substrate 130 due to the vibration of the vibrating element 510 may be prevented. As a result, the vibrating element 510 may be stably fixed to the cover substrate 130 without the black matrix 211 being lifted or peeled off.

The adhesive layer 310 may have light blocking property. Since the adhesive layer 310 has light blocking property, even if the black matrix 211 is not disposed in the opening 212, light transmission through the opening 212 may be blocked. Even if the vibrating element 510 is disposed on the opening 212 where the black matrix 211 is not disposed, light transmission through the opening 212 may be blocked by the adhesive layer 310 having light blocking property.

The adhesive layer 310 may include an adhesive polymer and a light blocking additive dispersed in the adhesive polymer.

The adhesive polymer may have adhesiveness and tackiness. Therefore, the adhesive polymer may also be referred to as an adhesive polymer. Examples of the adhesive polymer include acrylic resins, urethane resins, and epoxy resins. However, the adhesive polymer is not limited thereto, and other adhesive polymers may be applied to the adhesive layer 310.

Any material that may block light may be used as a light blocking additive without limitation. Carbon black may be used as a light blocking additive. Carbon black may be considered a type of black pigment. However, the light blocking additive is not limited thereto, and at least one of a black pigment and a black dye may be used as a light blocking additive. In addition to carbon black, other colored particles having a light blocking effect may be used as a light blocking additive. For example, silicon oxide particles, titanium oxide particles, aluminum oxide, etc. may be used as light blocking additives. In addition to pigments or dyes, UV diffusers such as metal nanoparticles, particularly Nano Metal, and UV diffuser beads may also be used as additives.

The adhesive layer 310 may overlap at least partially with the black matrix 211. More specifically, even when the adhesive layer 310 contacts with the vibrating element 510 on the opening 212, a portion of the adhesive layer 310 may overlap and contact the black matrix 211.

Even if a part of the adhesive layer 310 contacts the black matrix 211, the adhesive force for fixing the vibrating element 510 is mainly generated at the bonding portion between the adhesive layer 310 and the cover substrate 130. Therefore, even when the vibrating element 510 vibrates, peeling or separation of the black matrix 211 from the cover substrate 130 may be suppressed or prevented.

Figure 9:
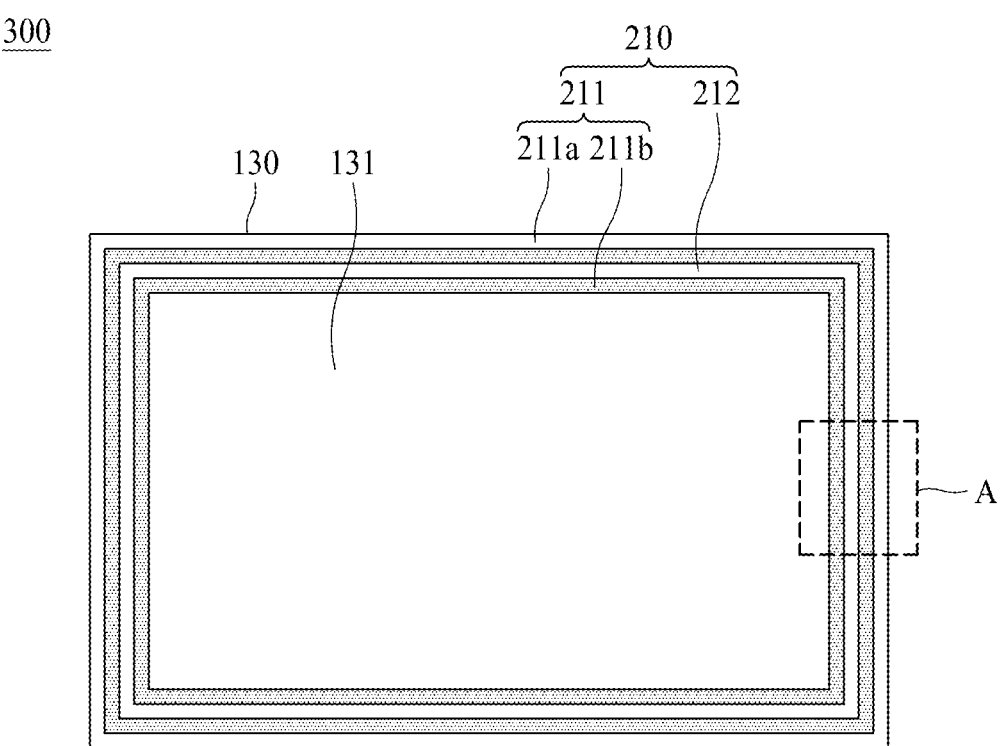
FIG. 9 is a plan view of a light shielding layer disposed on the cover substrate of a display apparatus according to another implementation of the present disclosure.
Figure 10A:
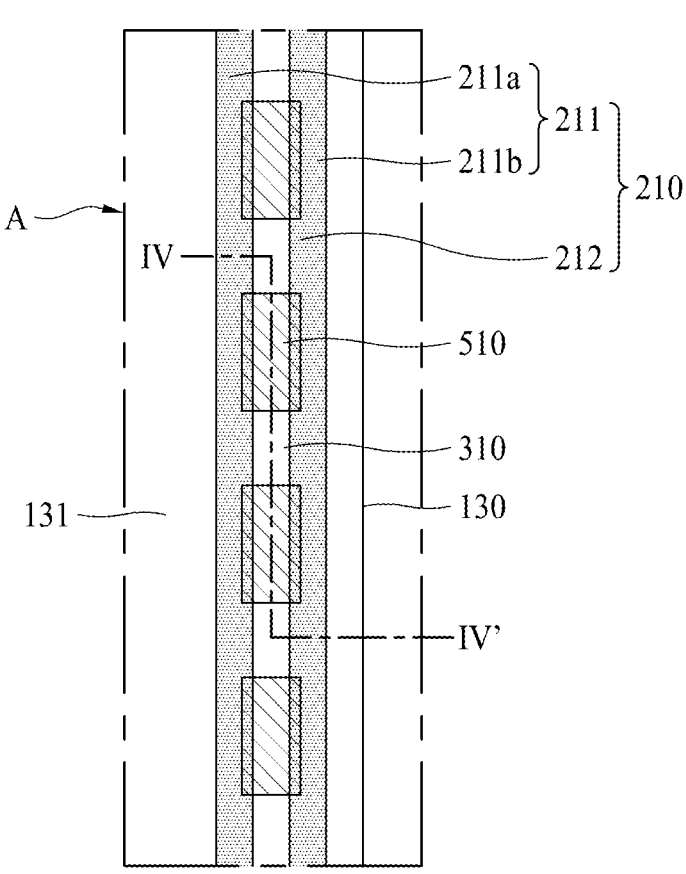
FIG. 10A is a plan view, in which vibrating elements are arranged on the light shielding layer of FIG. 9.
Figure 10B:
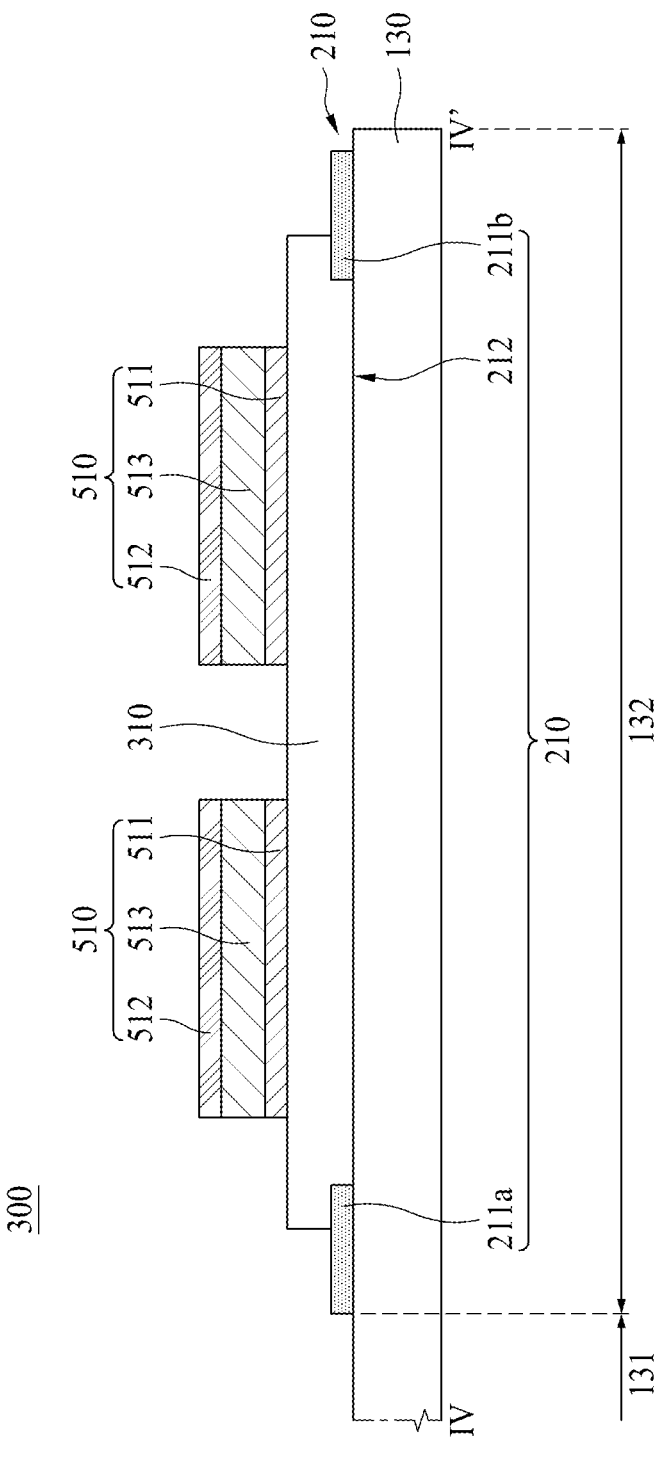
FIG. 10B is a cross-sectional view taken along line IV-IV' of FIG. 10A.

FIG. 9 is a plan view of a light shielding layer 210 disposed on a cover substrate 130 of a display apparatus 300 according to another implementation of the present disclosure, FIG. 10A is a plan view of a vibrating element 510 disposed on the light shielding layer 210 of FIG. 9, and FIG. 10B is a cross-sectional view taken along line IV-IV' of FIG. 10A. The light shielding layer 210 illustrated in FIG. 9 differs from the light shielding layers 210 described above in that it includes an opening 212 disposed between black matrix lines 211a, 211b.

Referring to FIG. 9, the black matrix 211 may include a first black matrix line 211a and a second black matrix line 211b that are spaced apart from each other. The opening 212 may be disposed between the first black matrix line 211a and the second black matrix line 211b. Referring to FIG. 9, the light shielding layer may include the first black matrix line 211a, the second black matrix line 211b, and the opening 212.

FIG. 10A may be a plan view of a vibrating element 510 is arranged in the "A" portion of FIG. 9. Referring to FIGS. 10A and 10B, the vibrating element 510 may be disposed on an opening 212 between a first black matrix line 211a and a second black matrix line 211b. An adhesive layer 310 is disposed on the opening 212, and the adhesive layer 310 may contact with the vibrating element 510 on the opening 212.

The adhesive layer 310 may contact with the cover substrate 130 at the opening 212. Accordingly, the vibrating element 510 may be attached to the cover substrate 130 via the adhesive layer 310. Since the adhesive layer 310 is in direct contact with the cover substrate 130, the vibrating element 510 may be strongly attached to the cover substrate 130.

According to another implementation of the present disclosure, the adhesive layer 310 has a light blocking property. The adhesive layer 310 may be disposed on the entire opening 212. Accordingly, even if the black matrix 211 is not disposed in the opening 212, light transmission through the opening 212 may be blocked.

Referring to FIGS. 10A and 10B, the vibrating element 510 may not be disposed on a portion of the adhesive layer 310. Even if the vibrating element 510 is not disposed on the opening 212, light transmission through the opening 212 may be blocked by the adhesive layer 310.

Figure 11A:
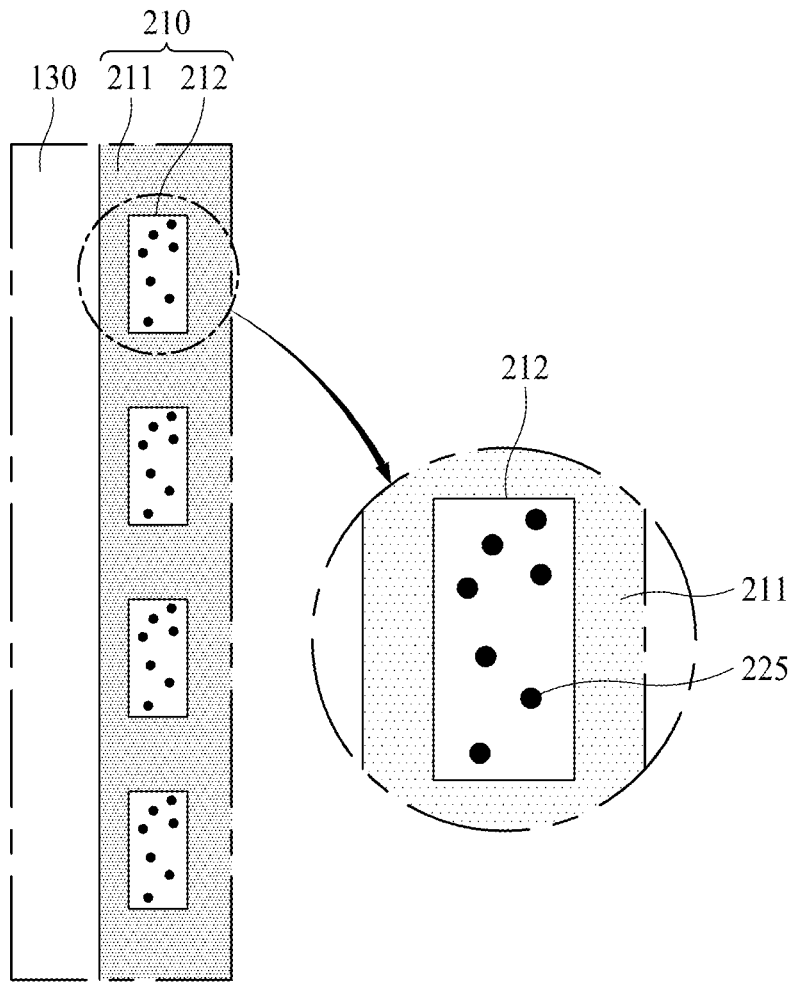
FIGS. 11A and 11B are plan views of the light shielding pattern formed on the opening, respectively.
Figure 11B:
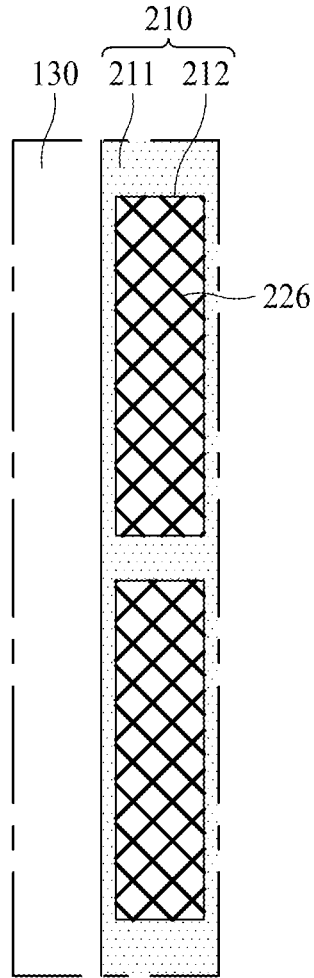

FIGS. 11A and 11B are plan views of the light shielding patterns 225, 226 formed in the opening 212, respectively.

Referring to FIGS. 11A and 11B, a light shielding pattern 225, 226 may be disposed in the opening 212. The light shielding pattern 225, 226 may be made of the same material as the black matrix 211. However, the light shielding pattern is not limited thereto, and the light shielding pattern may be made of a different material from the black matrix 211.

The light shielding pattern 225, 226 may be created when the black matrix 211 is formed, or the light shielding pattern 225, 226 may be created in a separate process after the opening 212 is formed.

When the light shielding pattern 225, 226 is disposed in the opening 212, the light blocking efficiency may be improved.

There is no particular limitation on the shape of the light shielding pattern 225, 226. As shown in FIG. 11A, the light shielding pattern 225 may have a dot-shaped plane. Referring to FIG. 11B, the light shielding pattern 226 may have a line-shaped plane. The light shielding pattern 226 may also have a grid-shaped plane formed by intersecting lines.

Figure 12A:
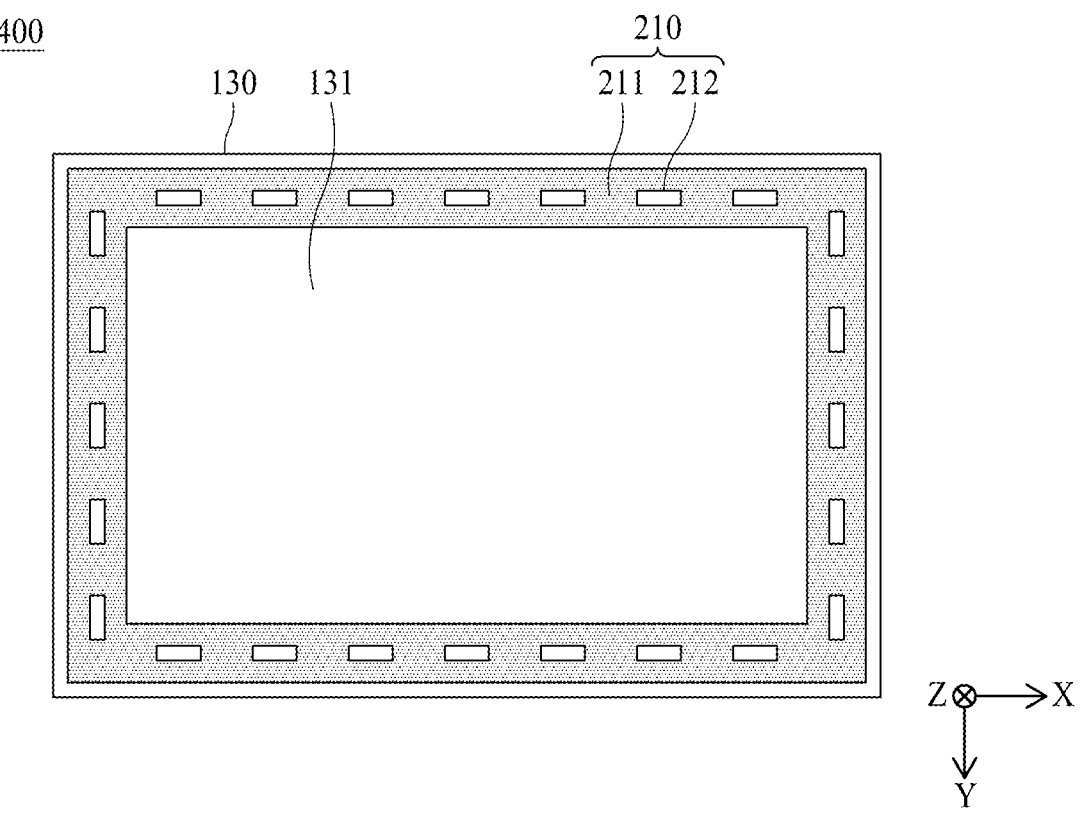
FIG. 12A is a plan view of a light shielding layer disposed on a cover substrate of a display apparatus according to another implementation of the present disclosure.
Figure 12B:
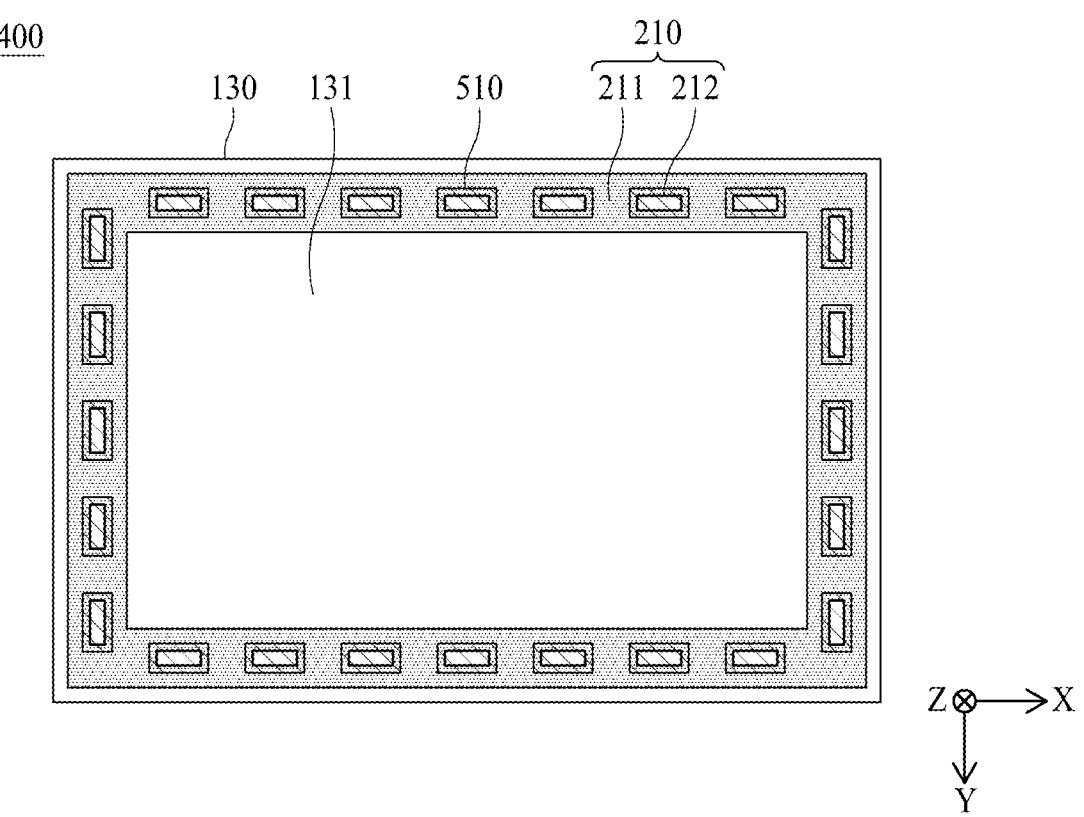
FIG. 12B is a plan view, in which vibrating elements are arranged on the light shielding layer of FIG. 12A.

FIG. 12A is a plan view of a light shielding layer 210 disposed on a cover substrate 130 of a display apparatus 400 according to another implementation of the present disclosure, and FIG. 12B is a plan view of a vibrating element 510 disposed on the light shielding layer 210 of FIG. 12A. The light shielding layer of FIG. 12 is different from the light shielding layers 210 described above in that it includes a plurality of opening 212 disposed to surround a light transmitting area 131.

Referring to FIG. 12A, a black matrix 211 may be arranged to surround a light transmitting area 131, and a plurality of opening 212 may be arranged to surround the light transmitting area 131. Referring to FIG. 12A, a plurality of opening 212 may be arranged along four sides constituting a cover substrate 130.

Referring to FIG. 12B, a vibrating element 510 may be disposed to surround the light transmitting area 131. The vibrating element 510 may be disposed on a light shielding layer 210 along four sides constituting a cover substrate 130.

Figure 13A:
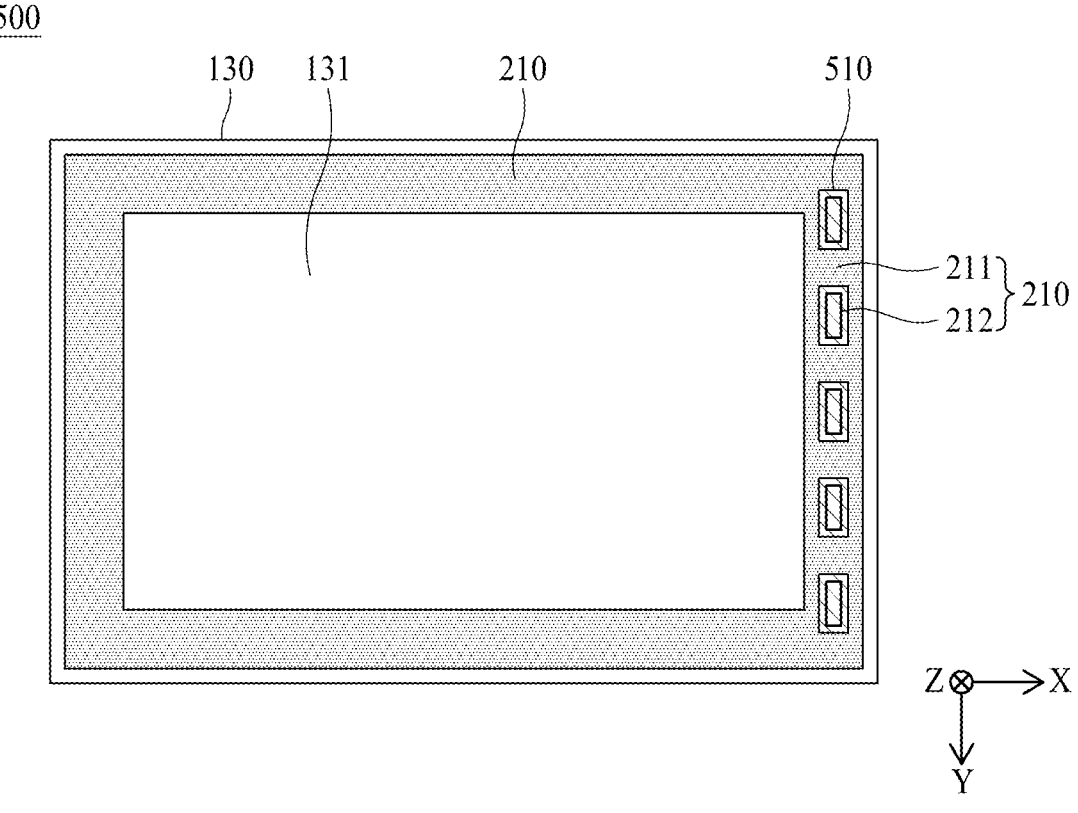
FIGS. 13A and 13B are plan views of a light shielding layer and vibrating elements arranged on a cover substrate of a display apparatus according to another implementation of the present disclosure, respectively.
Figure 13B:
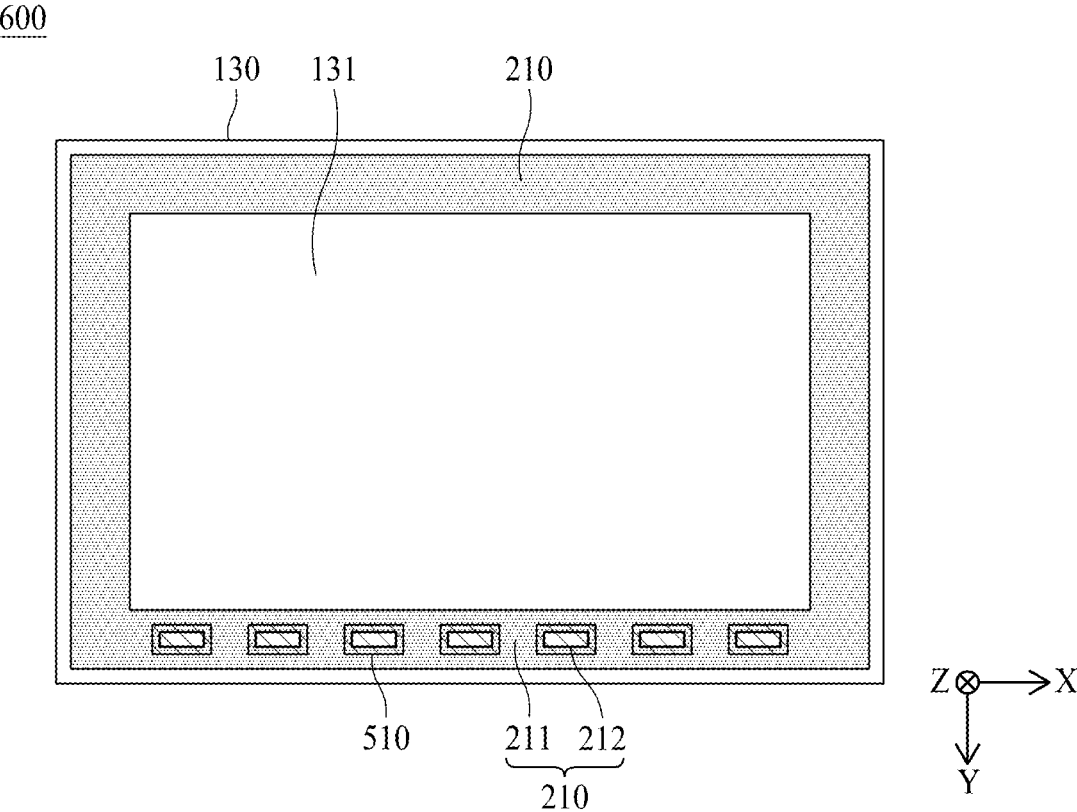

FIGS. 13A and 13B are plan views of a light shielding layer 210 and a vibrating element 510 disposed on a cover substrate 130 of a display apparatus 500, 600 according to another implementation of the present disclosure, respectively. The implementations of FIGS. 13A and 13B differ from the previously described implementations in that the vibrating element 510 is disposed only on one edge of the cover substrate 130.

Referring to FIGS. 13A and 13B, a light shielding layer 210 is disposed on the rear surface 130b of the cover substrate 130 to surround the light transmitting area 131, and a vibrating element 510 is disposed on the light shielding layer 210 at one edge of the cover substrate 130. The light shielding layer 210 includes a plurality of opening 212 formed on one side of the cover substrate 130, and a plurality of vibrating elements 510 may be disposed on the plurality of opening 212.

Referring to FIG. 13A, a plurality of vibrating elements 510 may be arranged along the vertical direction Y-axis direction of the drawing. Referring to FIG. 13B, a plurality of vibrating elements 510 may be arranged along the horizontal direction X-axis direction of the drawing.

Figure 14:
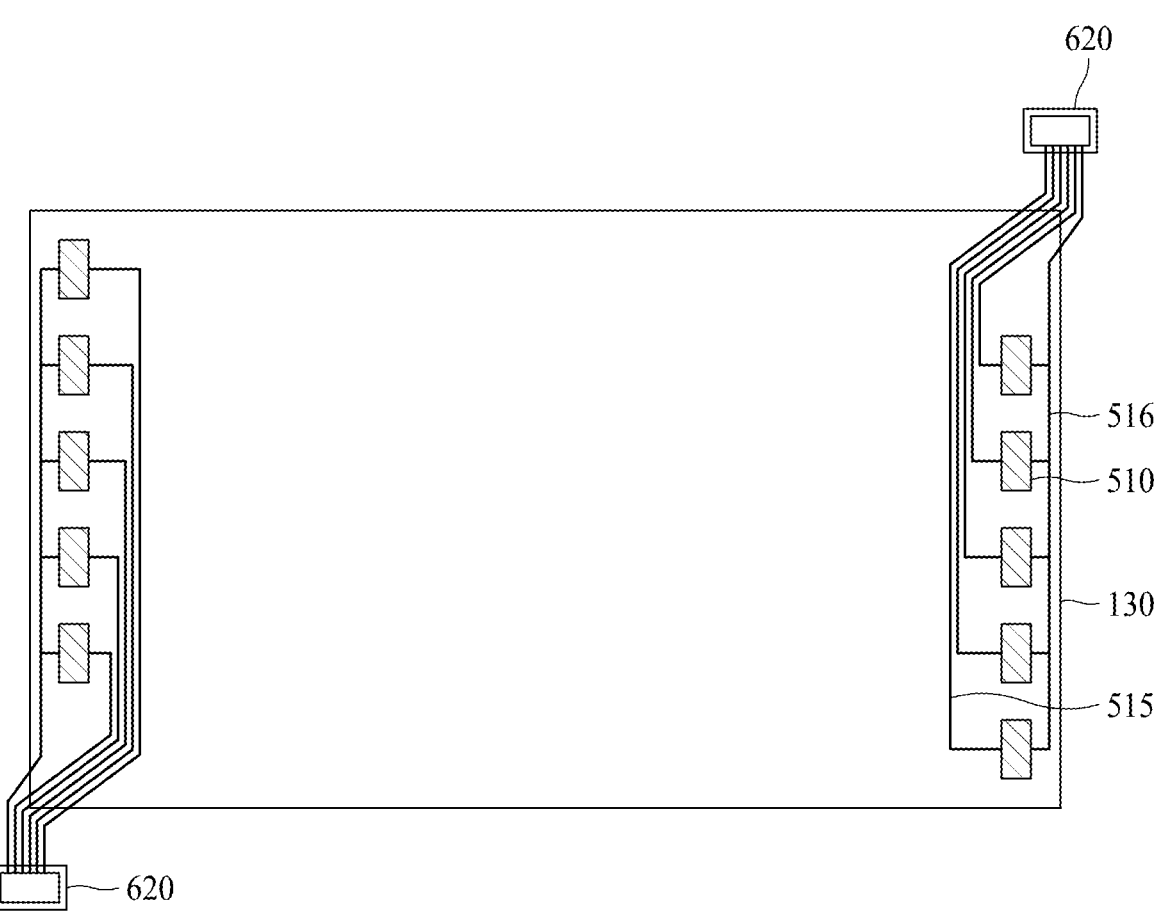
FIG. 14 is a schematic diagram of the wiring connected to the vibrating element.

FIG. 14 is a schematic diagram of the wiring connected to the vibrating element.

Referring to FIG. 14, the vibrating element 510 may be connected to the first connecting line 515 and the second connecting line 516. FIG. 14 illustrates an example of a connection relationship between the vibrating element 510 and the first connecting line 515 and the second connecting line 516 illustrated in FIG. 8A, but the connection relationship is not limited thereto. The vibrating elements 510 according to various other implementations described in the present disclosure may also be connected to the first connecting line 515 and the second connecting line 516.

According to one implementation of the present disclosure, the first connecting line 515 may be connected to the first electrode 511, and the second connecting line 516 may be connected to the second electrode 512. In addition, the first connecting line 515 and the second connecting line 516 may each be connected to a vibration driver 620. At least one of the first connecting line 515 and the second connecting line 516 may transmit a vibration driving signal of the vibration driver 620 to the vibrating element 510.

Referring to FIG. 14, the first connecting line 515 may be connected to the first electrode 511 to provide a vibration driving signal to the vibrating element 510. The vibration driving signal generated from the vibration driver 620 may be input to the first electrode 511 of the vibrating element 510 through the first connecting line 515. A plurality of vibrating elements 510 may be independently connected to the first connecting line 515.

The second connecting line 516 is connected to the second electrode 512 and may apply a common voltage to the vibrating element 510. The second electrode 512 may be connected to a ground terminal. Referring to FIG. 14, a plurality of vibrating elements 510 may be connected to one second connecting line 516.

FIGS. 15A, 15B, 15C and 15D are schematic diagrams of a state in which a vibrating element 510 is fixed by a fixing member 520, respectively.

The display apparatus 100, 200, 300, 400, 500, 600 according to implementations of the present disclosure may further include a fixing member 520 for fixing the vibrating element 510.

Figure 15A:
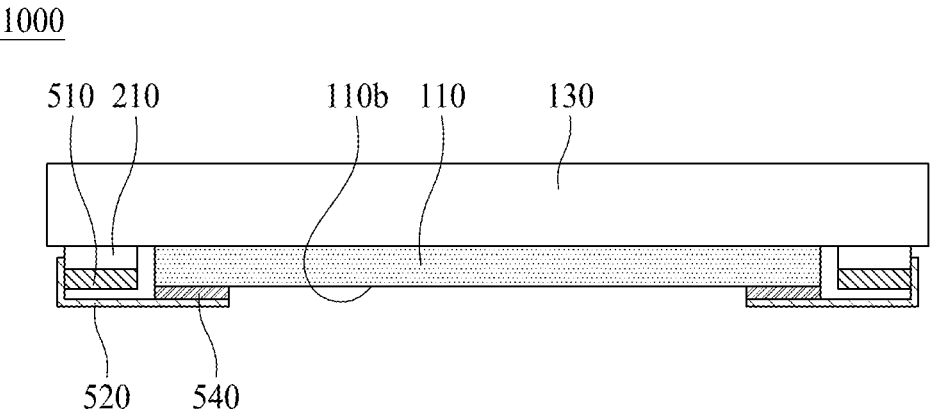
FIGS. 15A, 15B, 15C and 15D are schematic diagrams of a state where the vibrating element is fixed by a fixing member, respectively.

Referring to FIG. 15A, the display apparatus 1000 may include a fixing member 520, and one end of the fixing member 520 may be fixed to the display panel 110. The fixing member 520 may be implemented using a deformable flexible member or a hard member that is not easily deformable. The fixing member 520 may be fixed to the display panel 110 by a bonding member 540. As the bonding member 540, for example, there is a double-sided tape. Specifically, when a flexible member is used as the fixing member 520, a double-sided tape may be used as the bonding member 540.

The other end of the fixed member 520 may be connected to the vibrating element 510. As a result, the vibrating element 510 may be stably maintained in a fixed state by the adhesive layer 310 and the fixed member 520.

Figure 15B:
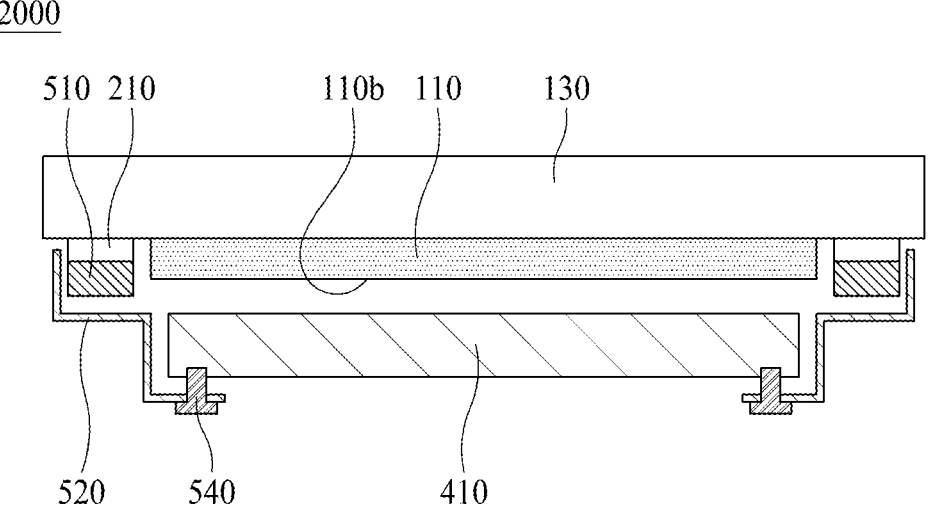
Figure 15C:
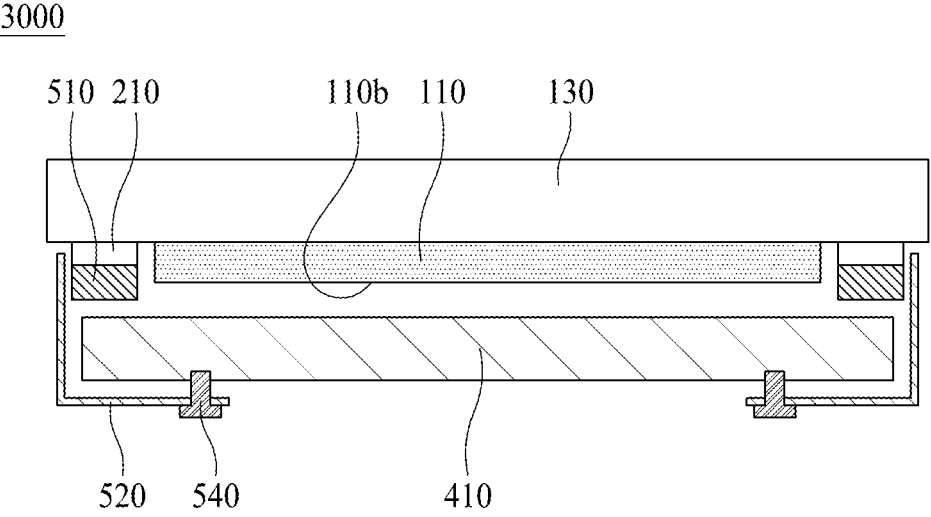
Figure 15D:
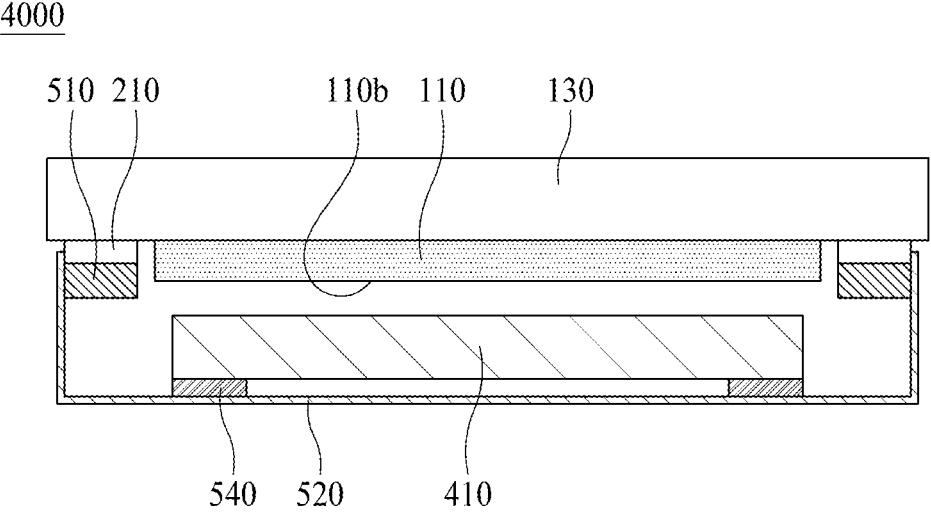

Referring to FIGS. 15B, 15C and 15D, the display apparatus 2000, 3000, 4000 may further include a backlight unit 410. The backlight unit 410 may overlap the display panel 110. The backlight unit 410 may be disposed on the rear surface 110*b* of the display panel 110.

In the display apparatus 2000 of FIG. 15B, the display apparatus 3000 of FIG. 15C, and the display apparatus 4000 of FIG. 15D, one end of the fixing member 520 may be fixed to the backlight unit 410. The fixing member 520 may be fixed to the backlight unit 410 by a bonding member 540. Examples of the bonding member 540 include double-sided tape, screws, bolts, and the like.

When a hard member is used as the fixing member 520, a screw or bolt may be used as the bonding member 540. FIGS. 15B and 15C illustrate examples of display apparatuses 2000, 3000 in which a screw or bolt is used as the bonding member 540.

As in the display apparatus 4000 of FIG. 15D, when a flexible member is used as a fixed member 520, the fixed member 520 may be fixed to the backlight unit 410 by a bonding member 540 such as a double-sided tape. However, the fastening means is not limited thereto, and even when a hard member is used as the fixed member 520, the fixed member 520 may be fixed to the backlight unit 410 by a fastening means such as a double-sided tape.

The display apparatus according to implementations of the present disclosure including a vibrating element 510 may be used as a display apparatus of a mobile electronic device such as a mobile phone, a smart phone, a smart watch, a tablet PC Personal Computer, or a watch phone, a smart television, an electronic whiteboard, a transparent display apparatus, an interactive digital signage, a notebook, a monitor, or a refrigerator, but implementations of the present disclosure are not limited thereto.

Additionally, the display apparatus including the vibration device may be applied to a vehicle by being implemented as a user interface device such as a central control panel in an automobile.

The present disclosure is not limited to the above-described implementations and the attached drawings, and it will be apparent to a person skilled in the art to which this specification pertains that various substitutions, modifications, and changes are possible within a scope that does not depart from the technical spirit of this specification.

According to one implementation of the present disclosure, since the vibrating element or actuator for tactile feedback is disposed on the light shielding layer, the display area of the display apparatus may not be reduced.

According to one implementation of the present disclosure, since the vibrating element or actuator is disposed on the black matrix or the opening defined by the black matrix, the display area of the display apparatus is not reduced even if the vibrating element or actuator is disposed.

In addition, according to one implementation of the present disclosure, the adhesive layer is used to fix the vibrating element or actuator to the cover substrate, and the adhesive layer may be in direct contact with the cover substrate. As a result, peeling or separation of the black matrix due to vibration of the vibration element or actuator may be prevented. In addition, when the adhesive layer directly contacts the cover substrate, the vibrating element or actuator may be stably fixed to the cover substrate.

In addition, according to one implementation of the present disclosure, the adhesive layer may include the black dye or the black pigment and has light blocking properties. Since the adhesive layer has light blocking property, even if the adhesive layer is placed in an opening, light incident through the opening may be blocked.

In addition to the effects mentioned above, other features and advantages of the present disclosure are described below or may be clearly understood by those skilled in the art to which the present disclosure pertains from such description and explanation.

What is claimed is:

1. A display apparatus comprising:
a display panel;
a touch unit on the display panel;
a cover substrate on the touch unit, the cover substrate including a light transmitting area and a light shielding area;
a light shielding layer on the light shielding area of the cover substrate;
a vibrating element on the light shielding layer; and
an adhesive layer between the light shielding layer and the vibrating element,
wherein the display panel overlaps the light transmitting area of the cover substrate,
wherein the light shielding layer comprises:
a black matrix disposed between the cover substrate and the vibrating element; and
an opening, in which the black matrix is not disposed,
wherein at least a portion of the adhesive layer is disposed in the opening, and
wherein at least a portion of the vibrating element is disposed on the adhesive layer and overlaps the opening.

2. The display apparatus of claim 1,
wherein the opening is an area from which the black matrix has been removed.

3. The display apparatus of claim 1,
wherein the adhesive layer contacts the cover substrate and the vibrating element on the opening.

4. The display apparatus of claim 1,
wherein the adhesive layer has light blocking property.

5. The display apparatus of claim 3,
wherein the adhesive layer partially overlaps the black matrix.

6. The display apparatus of claim 1,
wherein the black matrix includes a first black matrix line
   and a second black matrix line spaced apart from each
   other, and
wherein the opening is between the first black matrix line
   and the second black matrix line.

7. The display apparatus of claim 1 further comprising:
a light shielding pattern disposed in the opening.

8. The display apparatus of claim 1, wherein the vibrating
element includes:
   a first electrode;
   a piezoelectric layer on the first electrode; and
   a second electrode on the piezoelectric layer.

9. The display apparatus of claim 8, further comprising:
a touch sensing unit configured to sense a touch; and
a vibration driver configured to provide a vibration driv-
   ing signal to the vibrating element,
wherein the vibration driver is configured to generate the
   vibration driving signal based on a touch sensing signal
   from the touch sensing unit.

10. The display apparatus of claim 9, further comprising:
a first connecting line connected to the first electrode of
   the vibrating element; and
a second connecting line connected to the second elec-
   trode of the vibrating element,
wherein the vibration driving signal is input to the first
   electrode of the vibrating element through the first
   connecting line.

11. The display apparatus of claim 1, further comprising:
a fixing member that is fixed to the vibrating element.

12. The display apparatus of claim 11,
wherein one end of the fixing member is fixed to the
   display panel.

13. The display apparatus of claim 11, further comprising
a backlight unit overlapping the display panel, and
   wherein one end of the fixing member is fixed to the
      backlight unit.

* * * * *